Nov. 4, 1969　　　D. T. BOTTORF ET AL　　　3,476,846
PROCESS AND APPARATUS FOR EXTRUDING POLYOLEFINS
Filed July 17, 1967
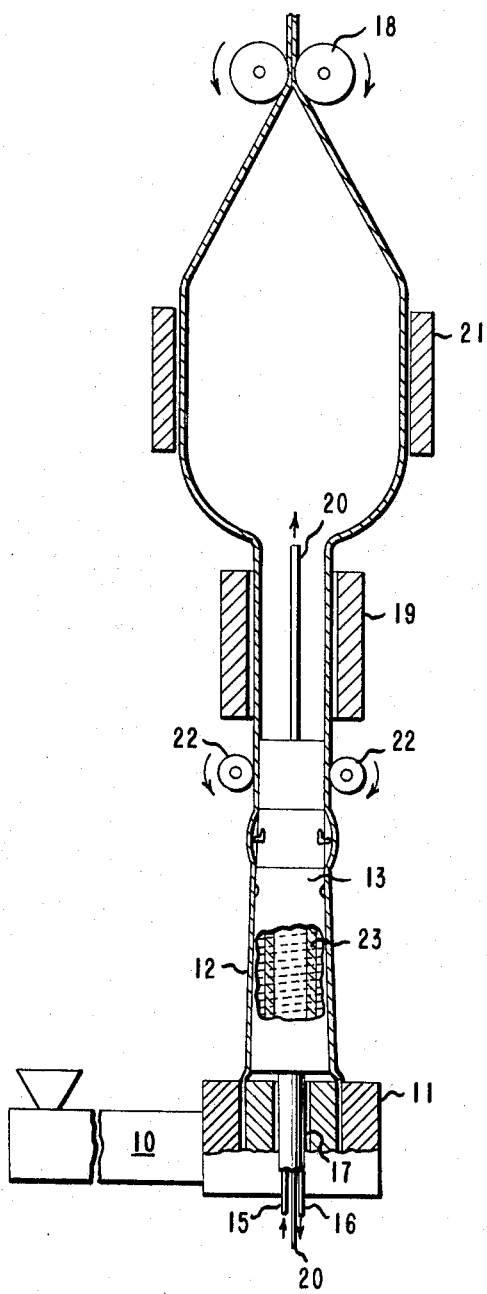
INVENTORS
DONALD THOMAS BOTTORF
EDWARD JOSEPH MOORE
BY *Claude L. Beaudoin*
ATTORNEY United States Patent Office 3,476,846
Patented Nov. 4, 1969

3,476,846
PROCESS AND APPARATUS FOR EXTRUDING POLYOLEFINS
Donald Thomas Bottorf and Edward Joseph Moore, Tonawanda, N.Y., assignors to E. I. du Pont de Nemours and Company, Wilmington, Del., a corporation of Delaware
Filed July 17, 1967, Ser. No. 653,701
Int. Cl. B29d 23/01; B29c 17/07
U.S. Cl. 264—95    6 Claims

ABSTRACT OF THE DISCLOSURE

A process is provided wherein polypropylene is melt-extruded in tubular form followed by cooling with a cooling device having a surface of plated aluminum oxide of between about 2 and about 12 microinches (RMS) surface finish.

THE INVENTION

The present invention relates to the extrusion of film structures of organic thermoplastic polymeric material and, more particularly, is directed to improvements in and relating to the extrusion of tubular film structures.

The present invention is generally applicable to the extrusion of tubular structures of a variety of organic thermoplastic polymeric materials such as, for example, polyethylene, polypropylene, etc., and copolymers thereof. For uniformity of expression these organic thermoplastic polymeric materials will be referred to herein on a collective basis as simply polyolefins, and the invention will be described hereinafter with reference to tubular structures of polyolefins and exemplified with specific reference to tubular articles of polypropylene.

Extrusion processes for tubular articles of polyolefins usually require extruding the polyolefin polymeric material in molten form through a die member having an annular orifice therein whereby the polyolefin exits from the die in tubular form. The tubular article of polyolefin is usually thereafter cooled by conducting or passing it in close proximity to a cooling device located either interiorly or exteriorly thereof. The tubular article of polyolefin is next usually molecularly oriented biaxially to enhance its physical properties. This is usually done by stretching the tubular structure lengthwise while simultaneously expanding the tubular structure circumferentially. The tubular structure is stretched longitudinally by means of a pair of nip rollers that rotate at a peripheral speed greatly exceeding the linear speed of the tubular structure when passing adjacent the cooling device above referred to. The nip rollers also collapse or pinch the tubular structure from a circular to a flat cross-section which conveniently permits the tubular structure to be expanded circumferentially by introducing a gaseous medium thereinto. All of the foregoing is described in greater detail in, for example, U.S. Patent Nos. 2,966,700; 2,987,765; 3,141,912; 3,-213,165 and 3,218,380. A major drawback and problem encountered heretofore in the tubular extrusion of polyolefins is the great difficulty and general inability to obtain tubular film structures having satisfactory haze properties. The packaging industry has become increasingly more demanding as regards the properties of packaging materials and improvements in the haze properties of extruded tubular film structures of polyolefins must be achieved before obtaining greater acceptability of that material as a premium packaging product.

According to the present invention there is provided a process for preparing tubular film structures of polyolefins which comprises melt-extruding a polyolefin polymeric material in tubular form and cooling said tubular film structure by passing it in close proximity to a cooling surface having a surface of plated aluminum oxide of between about 2 and about 12 microinches (RMS) surface finish and an effective length extending from about the plane or point of initial contact of said tubular film structure thereto to about the inner frost line of said tubular film structure. In a preferred embodiment, the process of the present invention embraces the preparation of an oriented tubular film structure of polyolefin polymeric material comprising melt-extruding a polyolefin polymeric material in tubular form, cooling said tubular film structure by passing it in close proximity to a cooling surface having a surface of plated aluminum oxide of between about 2 and about 12 microinches (RMS) surface finish and an effective length extending from about the plane or point of initial contact of said tubular film structure thereto to about the inner frost line of said tubular film structure, and biaxially orienting said tubular film structure by stretching it longitudinally while simultaneously expanding it circumferentially an amount at least twice its initial longitudinal and circumferential dimensions while also maintaining said film structure at a temperature within its orientation temperature range.

According to the present invention there is further provided an apparatus for preparing tubular film structures of polyolefin polymeric material which comprises an extruder having a die secured thereto provided with an annular orifice adapted for extruding therethrough said polyolefin polymeric material in tubular form, and cooling means disposed adjacent said die in cooperative association therewith, said cooling means having a surface of plated aluminum oxide of between about 2 and about 12 microinches (RMS) surface finish and a length extending between at least about the plane or point of initial contact of said tubular film structure adapted to be conducted therepast and about the inner frost line of said tubular film structure.

The nature and advantages of the invention will be more clearly understood by the following description and the view illustrated in the accompanying drawing which is a schematic view of the general arrangement of an apparatus for practicing the present invention.

Whenever used herein, the expression "(RMS)" means root-mean-square and refers to the measurement in microinches of the surface roughness of the cooling surface described herein on the basis of the average deviation from the mean value of the surface finish thereof.

The process and apparatus herein disclosed in illustration of the invention is shown schematically in the accompanying figure. Referring to the accompanying figure, the polyolefin is first heated to a temperature above its melting point in extruder device 10. The molten polyolefin is then extruded through die member 11 (shown partly in cross-section) in the form of a tubular film 12, which is drawn over but out of contact with a cooling mandrel 13 by means of the tube advancer device 14, having rollers such as 22 so constructed and arranged to contact the tubular film structure 12 for advancing it at a predetermined initial rate. Water is circulated through suitable conduits as 23 in the interior of cooling mandrel 13 which is connected at one end to inlet tube 15 and at its other end to outlet tube 16 that pass through a central hollow core 17 in die member 11. The cooling mandrel 13 serves to cool the tubular film structure to about room temperature.

The solidified tubular structure of polyolefin is then stretched longitudinally between tube advancer 14 and nip roller set 18. The longitudinal stretching or drawing is accomplished by operating the nip roller set 18 to advance tubular film 12 at a linear rate of speed that is at least 2 times the linear rate of speed imparted to tubular film 12 by tube advancer 14. The rollers of tube advancer 14 and nip roller set 18 rotate in the direction of the arrows shown in the accompanying figure. In traveling between tube advancer 14 and nip roller set 18 tubular film 12 is conducted through a heater device 19 which heats the tubular structure 12 to a temperature within the orientation temperature range and at which the film structure expands. The tubular film 12, immediately upon reaching the orientation temperature range, starts to expand due to the pressure therewithin. Air or other suitable gaseous medium is admitted through inlet tube 20 to provide the pressurizing medium within the tubular film structure for preventing collapse of the tubular film structure while it is at a temperature below its orientation temperature range and to expand the tubular film structure a predetermined amount when its temperature reaches the orientation temperature range. Tube 20 is connected at one end to a suitable source of pressurizing medium (not shown) usually air and passes through central hollow core 17 in die member 11 and extends past the cooling mandrel 13 to terminate slightly beyond heater device 19, as is shown in the accompanying figure.

As tubular film structure 12 expands, it approaches cooling ring 21 which operates to reduce the temperature thereof by means of a suitable cooling medium which is circulated therethrough by any suitable means. Expansion and elongation of tubular film structure 12 ceases when its temperature falls below that of its orientation temperature range.

It should be understood that the above-disclosed process for preparing a biaxially oriented tubular polyolefin film is merely a preferred process and should not be construed as limitative in the present invention. Any other process for preparing such a tubular film structure will suffice, for the present invention resides not in the initial preparation of a tubular polyolefin film, but rather in producing a polyolefin film substantially free of haze which comprises passing an extruded tubular polyolefin film structure in close proximity to a cooling device having a surface of plated aluminum oxide of between about 2 and about 12 microinches (RMS) finish and an effective length extending from about the plane or point of initial contact of said tubular film structure thereto to about the inner frost line of said tubular film structure. The term "haze" as utilized herein means the percentage of transmitted light passing through a specimen of material that deviates from the incident beam by forward scattering of an average of 2 to 5 degrees. A more detailed description of haze and the manner of measurement thereof is provided in ASTM D1003–61.

The salient feature of the present invention is the discovery that the haze problem connected with the extrusion of tubular film structures of polyolefins is avoided and substantially eliminated by contacting the freshly molten tubular polyolefin to a cooling surface plated with aluminum oxide. The aluminum oxide surface is flame plated by either the D-gun or the plasma torch technique.

The flame-plating technique embraces impinging high velocity coating particles onto the surface of a base material and is uniquely effective for applying hard surface coatings. Specifically, measured quantities of oxygen, acetylene and suspended particles of powdered coating material are pressure fed into a chamber of a specially constructed D-gun wherein the mixture is detonated by a time-controlled spark (4 times a second). The resulting detonation creates heat and pressure waves. Upon leaving the muzzle of the gun, the detonation wave becomes a shock wave and is dissipated in the air. The jammed gases (products of ignition and detonation) then burst out carrying the hot suspended coating powder with them. All the burning takes place inside the gun, with only the hot particles (traveling at 2500 ft. per second) hitting the base material (at a distance of 2 to 4 inches) to be coated. On impact, the coating particles flatten out and successive detonations of the flame coating device build up the coating to the desired thickness to produce a coating that is laminar in structure. A more detailed description of flame-plating appears in Bulletin F–1646, Linde Division of Union Carbide Corporation.

The plasma-plating technique, complimentary to flame-plating, uses a plasma torch which produces and controls a high velocity inert gas stream that can be maintained at very high temperatures. The high temperature plasma jet is produced by an internal (nontransferred) electric arc. The hot gas stream is capable of melting and accelerating to high velocity particles of known solid inorganic material which will melt without decomposition. When these particles strike the part being coated, they impact to form a dense high purity layer.

The surface finish of the flame-plated aluminum-oxide cooling surface should be between about 2 and about 12 microinches (RMS). Surface finishes greater than about 12 microinches (RMS) are not desirable since such surfaces tend to scratch the surface of the tubular film structure passing thereover which are undesirable and objectionable. Therefore, any surface finish of up to about 12 microinches (RMS) is satisfactory and satisfactory results have been obtained with surface finishes of about 2 microinches (RMS).

An essential feature of the present invention is that the length of the flame-plated aluminum oxide portion of the cooling surface should be at least from the plane or point of initial contact of the freshly extruded tubular film structure to the inner frost line on the surface thereof and preferably extending beyond both the inner and outer frost lines.

The frost line is the zone or initial plane of crystallization of the polymeric material of the tubular structure. The plane of crystallization can be observed as a substantially circumferential element around the tubular structure which is substantially in thermal equilibrium with the cooling surface. The frost line is more accurately a band as opposed to a distinct line over which the extruded film structure assumes an opaque appearance. Thus, the frost line of a freshly extruded tubular film structure is easily discernible since upstream thereof the tubular film structure is clear and transparent, whereas, downstream thereof the tubular film structure is opaque. A freshly extruded tubular structure may have two "frost lines," one on the inside and one on the outside of the tube, depending upon the process conditions utilized during manufacture.

The principle and practice of the present invention is illustrated by the following example which is provided to show the practice and use thereof, but it is not intended that the invention be limited thereto since modifications in technique and operation will be apparent to anyone skilled in the art.

EXAMPLE

An extrusion apparatus as illustrated in the accompanying figure was employed to evaluate cooling surfaces of several different base materials and coatings thereon. The cooling mandrel employed was provided with a cylindrical shell having replaceable outer sleeve elements each about 4 inches in length which were interchanged for the evaluation.

An extrusion die of 5-inch diameter having a 20 mil annular orifice opening was used. The quench mandrel was 4.905 inches in outside diameter and had a uniform taper of 0.015 inch per inch of lineal length. The total mandrel length was 18 inches. The flame-plated initial portion was 4 inches in length.

Polypropylene resin at a melt temperature of 209° C. was extruded from the die at a rate of 40 pounds per hour. The cast tube had a wall thickness of 20 mils. The cooling mandrel had cold water (20° C.) circulating therewithin at a volume rate of ⅓ cubic foot per minute. The inner frost line was about 3/16 inch above initial edge of the quench mandrel. The cast tube was withdrawn at a rate of 6 feet per minute by the tube advancer.

Subsequently, the cast tube was heated to a temperature of 140° C. and stretched biaxially 25× under an internal pressure of 4 inches of water and a longitudinal force by the collapsing nip rolls operating at a speed of 30 feet per minute. The resulting oriented polypropylene film was 0.75 mil thick.

Each of the quench mandrel base sleeves listed in the table below were evaluated, as illustrated by their influence of the tubular film haze, under identical conditions above described.

From the table, it is obvious that the aluminum sleeve base flame-plated with aluminum oxide permitted production of film having significantly lower haze than any of the other materials and coatings.

4. Apparatus for preparing tubular film structures of polyolefin polymeric material comprising an extruder having a die secured thereto provided with an annular orifice adapted for extruding therethrough said polyolefin polymeric material in tubular form, and cooling means disposed adjacent said die and in cooperative association therewith, said cooling means having a surface of plated aluminum oxide of between about 2 and about 12 microinches (RMS) surface finish and a length extending between at least about the plane of initial contact of said tubular film structure adapted to be conducted therepast and about the inner frost line of said tubular film structure.

TABLE

| Test Sample | Cooling Mandrel Outer Sleeve | | | Cooling Mandrel Outer Sleeve Surface | | | | Haze percent | |
|---|---|---|---|---|---|---|---|---|---|
| | Material | Thickness (inches) | B.t.u./hr. ft.² ° F./ft. 300° F. | Material | Thickness (inches) | B.t.u./hr. ft.² ° F./ft. 300° F. | Finish (RMS) (microinch) | Total | Adjacent Surface (inside) |
| 1 | Aluminum | 0.3947 | 90 | Anodized | 0.0003 | 1.0 | 8-12 | 4.1 | 3.6 |
| 2 | Beryllium-Copper "25" | 0.375 | 54 | | | 54.0 | (¹) | 3.7 | 3.0 |
| 3 | Copper | 0.375 | 200 | | | 200 | (¹) | 2.7 | 1.7 |
| 4 | Aluminum | 0.3745 | 90 | Electrolized | 0.0005 | 39.0 | 6.5 | 2.8 | 2.0 |
| 5 | Beryllium-Copper "275" | 0.375 | 54 | | | 54.0 | (¹) | 6.7 | 6.0 |
| 6 | Aluminum | 0.372 | 90 | Rockide "C" (Cr₂O₃) | 0.003 | 1.5 | 2.5-4.5 | 2.8 | 2.4 |
| 7 | do | 0.372 | 90 | Tungsten Carbide Flame-plated | 0.003 | 4.5 | | 4.4 | 3.6 |
| 8 | do | 0.372 | 90 | Aluminum Oxide Flame-plated | 0.003 | 1.0 | 3.5-6 | 1.7 | 1.0 |

¹ Surface too soft to measure finish texture with the "Profilometer."

What is claimed is:

1. A process of manufacture for preparing tubular film structures of polyolefins which comprises melt-extruding a polyolefin polymeric material in tubular form and cooling said tubular film structure by passing it in close proximity to a cooling surface having a surface of plated aluminum oxide of between about 2 and about 12 microinches (RMS) surface finish and an effective length extending from about the plane of initial contact of said tubular film thereto to about the inner frost line of said tubular film structure.

2. The process of claim 1 wherein said tubular film structure is biaxially oriented by stretching said film structure longitudinally while expanding said tubular film structure circumferentially an amount at least twice the initial longitudinal and circumferential dimensions thereof while maintaining said film structure at a temperature within its orientation temperature.

3. The process of claim 2 wherein said tubular film structure is stretched longitudinally and expanded circumferentially at least 2×.

5. The apparatus of claim 4 wherein the aluminum oxide surface of said cooling means is flame-plated thereon.

6. The apparatus of claim 5 wherein said cooling means consists of a cylindrical mandrel secured centrally to said die and extending outwardly therefrom coaxially with said annular orifice.

References Cited
UNITED STATES PATENTS

| | | | |
|---|---|---|---|
| 3,144,494 | 8/1964 | Gerow | 18—145 XR |
| 3,246,061 | 4/1966 | Baltz | 264—95 |
| 3,364,524 | 1/1968 | Hsia. | |
| 3,412,189 | 11/1968 | Sullivan | 264—95 |

WILLIAM J. STEPHENSON, Primary Examiner

U.S. Cl. X.R.

18—14, 47